US008657595B2

(12) United States Patent
Feigenblum et al.

(10) Patent No.: US 8,657,595 B2
(45) Date of Patent: Feb. 25, 2014

(54) DEVICE FOR TRANSFORMING MATERIALS BY INDUCTION HEATING

(75) Inventors: José Feigenblum, Grenoble (FR); Alexandre Guichard, La Chapelle du Mont du Chat (FR)

(73) Assignee: Roctool, Le Bourget du lac (FR)

( * ) Notice: Subject to any disclaimer, the term of this patent is extended or adjusted under 35 U.S.C. 154(b) by 0 days.

(21) Appl. No.: 13/176,195

(22) Filed: Jul. 5, 2011

(65) Prior Publication Data

US 2012/0025428 A1 Feb. 2, 2012

Related U.S. Application Data

(63) Continuation-in-part of application No. 12/064,885, filed on Feb. 26, 2008, now abandoned.

(51) Int. Cl.
*B29C 35/02* (2006.01)
(52) U.S. Cl.
USPC ............................................. 425/174.8 R
(58) Field of Classification Search
USPC ............................................. 425/174.8 R
See application file for complete search history.

(56) References Cited

U.S. PATENT DOCUMENTS

| 4,197,441 | A |  | 4/1980 | Rudd |
| 4,439,492 | A |  | 3/1984 | Wada |
| 4,622,445 | A |  | 11/1986 | Matsen |
| 5,061,162 | A | * | 10/1991 | Gravelle ............................ 425/3 |
| 5,483,043 | A |  | 1/1996 | Sturman, Jr. |
| 5,571,436 | A |  | 11/1996 | Gregg |
| 5,571,437 | A |  | 11/1996 | Rudd |
| 5,808,281 | A | * | 9/1998 | Matsen et al. ................. 219/634 |
| 6,043,469 | A |  | 3/2000 | Fink |
| 6,619,940 | B1 | * | 9/2003 | Wang et al. ....................... 425/3 |
| 6,864,419 | B2 | * | 3/2005 | Lovens .......................... 174/350 |
| 6,884,966 | B2 | * | 4/2005 | Coleman et al. .............. 219/243 |

(Continued)

FOREIGN PATENT DOCUMENTS

| CN | 1453376 | 11/2003 |
| CN | 1504065 | 6/2004 |

(Continued)

OTHER PUBLICATIONS

Guichard (JEC Composites, High Speed Processing using electromagnetic induction, Aug.-Sep. 2004 Edition, pp. 94-96).*

(Continued)

*Primary Examiner* — Amjad Abraham
(74) *Attorney, Agent, or Firm* — IM IP Law PLLC; C. Andrew Im

(57) ABSTRACT

The present invention concerns a device for molding of thermoplastic matrix composite materials or thermosetting materials. Two mold casings that are mobile relative to each other, electrically conductive material include a molding zone designed to be in contact with the material to be transformed, and an induction circuit for generating a magnetic field. The faces of one of the two mold casings are situated so as to be facing induction circuit, except for the molding zones, being coated with a shielding layer made of a non-magnetic material preventing the magnetic field from penetrating into the mold casings. The mold casings are electrically insulated from each other during the molding phase to define an air gap wherein flows the magnetic field that induces currents at the surface of the molding zones, thus localizing the heating at the interface between the molding zone and the material to be transformed.

12 Claims, 2 Drawing Sheets

(56) References Cited

U.S. PATENT DOCUMENTS

| | | | |
|---|---|---|---|
| 2002/0003011 A1 | 1/2002 | Dykstra | |
| 2004/0041303 A1* | 3/2004 | Kim et al. | 264/320 |
| 2004/0058027 A1 | 3/2004 | Guichard | |
| 2004/0222566 A1 | 11/2004 | Park | |
| 2004/0256382 A1 | 12/2004 | Pilavdzic | |
| 2005/0035115 A1 | 2/2005 | Anderson | |
| 2007/0267405 A1 | 11/2007 | Feigen-Blum | |
| 2008/0230957 A1* | 9/2008 | Feigenblum et al. | 264/401 |

FOREIGN PATENT DOCUMENTS

| | | | |
|---|---|---|---|
| FR | 2816237 | 5/2002 | |
| FR | 2867939 | 9/2005 | |
| JP | 57193340 | 11/1982 | |
| JP | 2000280281 A * | 10/2000 | B29C 45/14 |

OTHER PUBLICATIONS

Office Action U.S. Appl. No. 10/588,624, dated Jun. 19, 2008.
Office Action U.S. Appl. No. 10/588,624, dated Jan. 13, 2009.
Office Action U.S. Appl. No. 10/588,624 dated Apr. 17, 2009.
International Search Report dated Jan. 9, 2007.
Chinese Office Action with English Translation dated Mar. 15, 2010.
International Search Report dated Sep. 25, 2006.
Jan H. Schut, Plastics Technology, Composites New Rapid Molding Techniques and Unusual Reinforcements at Paris JEC Show, Jun. 2005.
JEC Composites Table of Contents, Apr. 2005.
Guichard Alex and Feigenblum Jose, High Speed Processing: Using electromagnetic induction, JEC Composites, Aug.-Sep. 2004, pp. 94-96.
Final Office Action U.S. Appl. No. 12/064,884 dated Jan. 5, 2011.
Office Action U.S. Appl. No. 12/064,885, dated Apr. 10, 2009.
Office Action U.S. Appl. No. 12/064,885, dated Nov. 9, 2009.
Office Action U.S. Appl. No. 12/064,885, dated Jul. 21, 2010.
Final Office Action U.S. Appl. No. 11/993,159, dated May 18, 2011.
Office Action U.S. Appl. No. 11/993,159, dated Oct. 6, 2010.

* cited by examiner

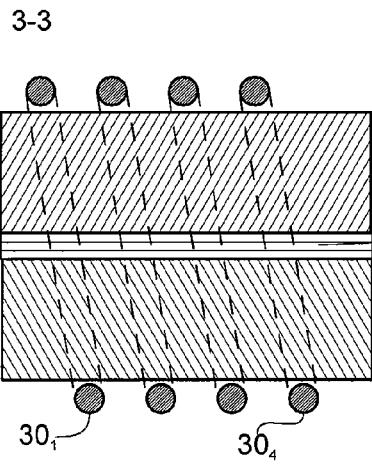
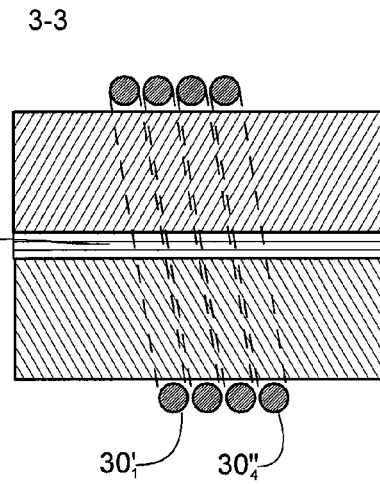
Fig. 3A  Fig. 3B
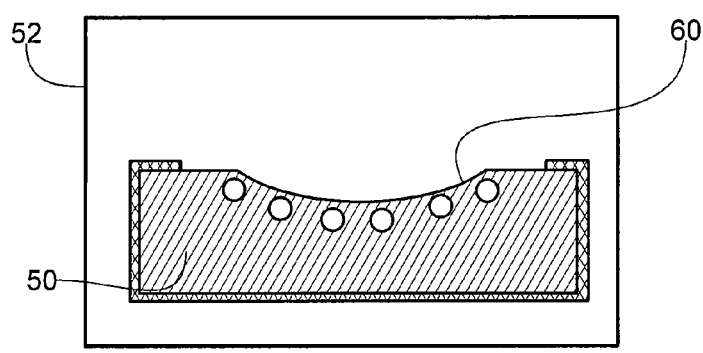
Fig. 5
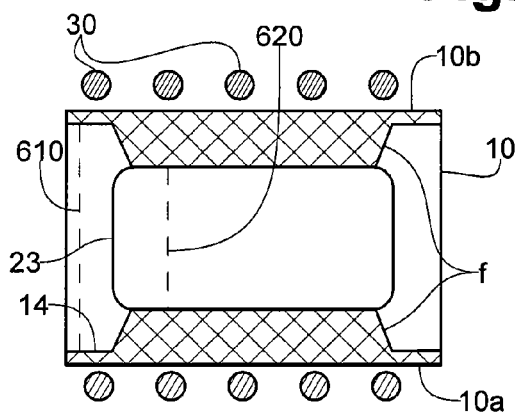
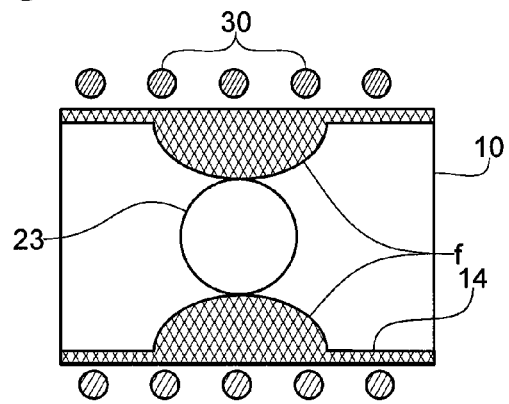
Fig. 6A  Fig. 6B

DEVICE FOR TRANSFORMING MATERIALS BY INDUCTION HEATING

This application is a continuation in part of co-pending U.S. application Ser. No. 12/064,885 which is incorporated herein as reference.

SUMMARY

This invention relates to a device and method using induction heating, for transforming or molding materials and more specifically for shaping thermoplastic matrix composite materials or thermosetting materials. Induction heating of mold casings, combined with cooling means of said mold casings, is a way to achieve a quick transformation process for composite materials with a thermoplastic or thermoset matrix. Induction heating devices known from the prior art exhibit at least two major problems
 (1) the control of the temperature distribution over the mold during the transformation process, specifically when the heating and cooling phases follow each other quickly since a constant state cannot be reach;
 (2) the large amount of material making up the mold casings that has to be heated as compared with the amount of material to be transformed.

In order to solve these prior art issues, the invention relates to a device for transformation, by heating through conduction of thermoplastic matrix composite materials or thermosetting materials, said device comprising:
a. two mold casings that are mobile relative to each other, made out of an electrically conductive material having a first electrical resistivity, each casing including a molding face comprising a surface relief forming dies complementary in shape and designed to be in contact with the material to be transformed in order to heat the material by conduction, and
b. induction means enveloping the casing of the mold for generating a magnetic field with a frequency F ranging from 25 kHz to 100 kHz,
c. the faces of at least one of the two mold casings situated so as to be facing the induction means, being coated with a shielding layer made of a non-magnetic material having a second electrical resistivity which is lower than the first electrical resistivity preventing the magnetic field from penetrating into the mold casings, said shielding layer extends over a part of the molding surface outside of the die surface and is electrically connected to the molding surface to form an electrical pathway between the shielding layer and the molding surface, said layer having a thickness greater than a penetration depth of the magnetic field, said shielding being located between the induction means and the faces of the mold casing, and
d. the mold casings being electrically insulated from each other during the molding phase so that the molding faces of the two mold casings are separated by an air gap, wherein the magnetic field induces currents that flow continuously through the electrical pathway from the shielding layer to the molding surface of each mold casing and the outline limiting the extension of the shielding layer over the molding face being chosen such as to control the travel length of currents from one side to the other of the shielding layer following the surface of the die in the first material.

The outline of the limit of the extension of the shielding layer over the molding face offsets the travel length of the currents over the three dimensional surface of the die. This feature gives an additional degree of freedom for controlling the temperature distribution over the die during induction heating.

Furthermore, the invention limits induction heating to a surface, in order to localize the heating at the mold/transformed material interface, thus limiting energy consumption and therefore improving the energy efficiency of the device. The productivity is also increased with reduced heating and cooling times because a fraction only of the volume of the mold is subjected to induction heating.

According to one embodiment, the outline limiting the extension of the shielding layer over the molding face is chosen as so as to get a constant electrical resistance over the travel length of electrical currents over the die surface. Achieving such a constant electrical resistance combining the electrical resistivity of the shielding layer and the mold casing material over the travel length of currents over the die surface provides a uniform temperature over this surface According to one embodiment, the two mold casings are coated with a shielding layer.

According to one embodiment, the mold casings are made of steel having high relative magnetic permeability and resistivity (e.g. a nickel-based, chromium-based and/or titanium-based steel).

According to one embodiment, one mold casing is coated with a shielding layer, and the other mold casing is made of a non-magnetic material with low electrical resistivity, (e.g. aluminum).

According to one embodiment, the mold casing is coated with a shielding layer is made of a magnetic compound, preferably having high relative magnetic permeability and resistivity (e.g. a nickel-based, chromium-based and/or titanium-based steel).

According to one embodiment, the shielding layer is made of a metal sheet wrapped round the magnetic mold casing and fixed to said mold casing. In one example this metal sheet is soldered or screwed in.

According to one embodiment, the shielding layer is made of an electrolytic deposit of a metallic material.

According to one embodiment, the thickness e of the shielding layer is at least equal to:

$$e = 50 * (\rho/F)^{1/2}$$

$\rho$ being the resistivity of the non-magnetic material, and F the frequency of the magnetic field.

According to one embodiment, the shielding layer is made of a non-magnetic material of low electrical resistivity, comprising copper or aluminum for the most part.

According to one embodiment, an electrically insulating layer is applied to the molding face of at least one mold casing to electrically insulate the casings, for example when the material to be transformed is conductive.

According to one embodiment, the inductive means comprise two parts, each one fixedly joined to one of the mold casings to enable the opening of a device, and being capable of being shifted with the respective mold casing.

According to one embodiment, the two parts of the inductive means are electrically connected by means of at least one electrical contactor enabling contact to be maintained during the relative shift of one mold casing relative to the other one during the transformation phase.

According to one embodiment, at least one of the mold casings comprises means for cooling this mold casing.

The invention also relates to a method for the manufacture of parts, especially in large batches, making use of the device defined here above and comprising the following steps:

a. placing the material to be transformed over the molding face of the cold mold casing while the two mold casings of the device are separated;
b. moving closer the two mold casings to connect the inductive means of the two mold casings;
c. heating the molding faces of the mold casings to a transformation temperature by powering the inductive means while pressurizing the material to be transformed in the air gap between the two mold casings;
d. stop the powering of the inductive means and cool at least one of the mold casings down to a defined temperature;
e. open the mold and turn out the transformed material.

BRIEF DESCRIPTION OF DRAWINGS

Other features and advantages of the invention shall appear from the following description, made by way of a non-restrictive example with reference to the drawings, of which:

FIGS. 3a and 3b show two different arrangements of inductors for the mold device shown in FIG. 1, these figures corresponding to views along the line 3-3 of FIG. 2, FIG. 5 shows a second variant.

FIG. 6A is an elevation view of a mold casing in case of a rectangular die,

FIG. 6B is an elevation view of a mold casing in case of a spherical die.

DETAILED DESCRIPTION

Figure 1:
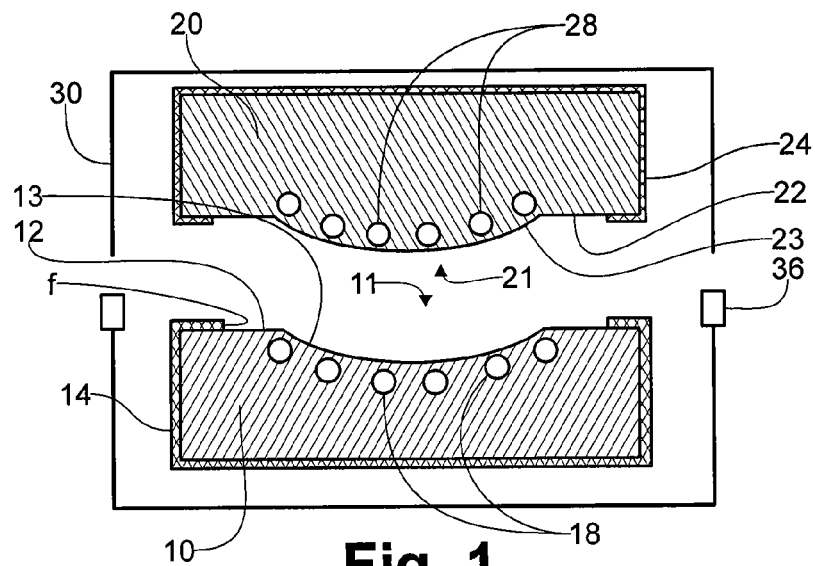
FIG. 1 shows a mold device according to the invention.
Figure 2:
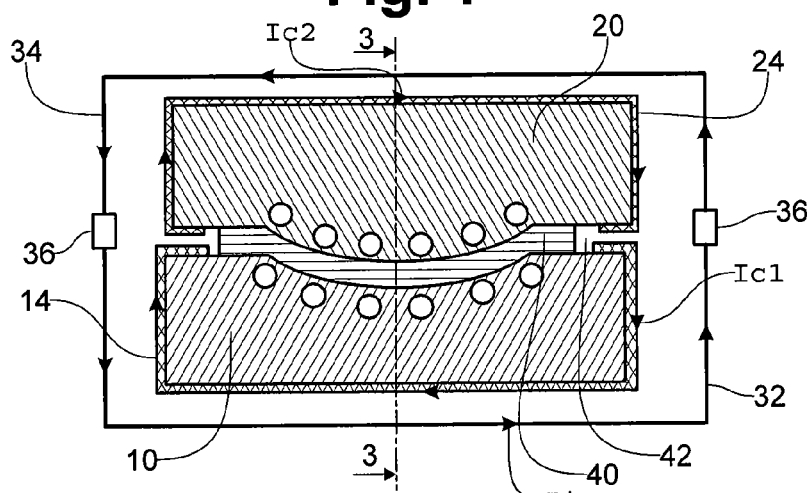
FIG. 2 shows the mold device of FIG. 1 during the transformation of a material.

The molding device shown in FIGS. 1 and 2 comprises two mold casings 10 and 20 moving relative to each other. The mold casings 10, 20 are made of a magnetic material, and have mutually facing molding faces 11, 21. The molding faces comprise a molding zone 12, 22 each molding zone including a die 13, 23 complementary in shape.

A network of inductors 30, electrically connected in parallel or in series to a current generator, is positioned about the mold casings. Each inductor 30 comprises a conductive turn and comprises two separable parts 32, 34, each one being fixedly joined to a mold casing, 10, 20 respectively.

One part of the external surface of each mold casing 10, 20, except for the molding zones 12, 22, is lined with a shielding layer 14, 24. In the example, the shielding coats the external faces of the mold casings situated so as to be facing the inductors 30 and one part of the mutually facing faces of the two mold casings. However, it is not necessary for the external faces of the mold casings that are not facing an inductor (i.e. the faces parallel to the plane of FIG. 1) to be coated with a shielding 7.

FIG. 1 shows the two mold casings at a distance from each other before molding. FIG. 2 is similar to that of FIG. 1 and shows the two mold casings during the molding operation.

During the transformation of a material 40, as shown in FIG. 2, this material is gripped and held under pressure between molding zones 12, 22 of the two mold casings. The material then provides the electrical insulation between these two mold casings 10, 20. Through this electrical insulation, the space demarcated by the facing surfaces of the two mold casings constitutes air gap 42 enabling the circulation of a magnetic field in this space.

When the inductor means comprising conductive turns 30 are crossed by alternating electrical currents Ii with a frequency F, for example ranging from 25 to 100 KHz, the inductors generate a magnetic field that envelops the mold casings 10, 20.

The magnetic field thus generated crosses the mold casings and also circulates in the air gap (i.e. between the mold casings).

The magnetic field induces currents in directions opposite to the directions of the currents Ii and the presence of the air gap enables the generation of the induced currents Ic1 and Ic2 which flow on the surface of each of the two mold casings.

The shielding layer prevents the magnetic field from reaching the mold casing, except for the molding zones.

These induced current Ic1 and Ic2 therefore have thermal action chiefly on the surface of the molding zone which is therefore the main zone heated by the action of the inductors. Since the shielding is non-magnetic, it is not heated significantly by induction.

In order that the device may work efficiently, the shielding layer has a thickness greater than the penetration depth of the magnetic field (skin thickness).

Thus, the magnetic field is prevented from reaching the mold casing and heating it in places other than the molding zone.

To determine the thickness of the shielding layer required, the following formula is used:

$$e=50*(\rho/F \cdot \mu r)^{1/2}$$

where $\rho$ is the resistivity of a non-magnetic field, $\mu r$ is the relative magnetic permeability of the material, and F the frequency of induction currents. For a non-magnetic material, we take: $\mu r=1$, and the formula becomes:

$$e=50*(\rho/F)^{1/2}$$

In order that the magnetic shielding may be effective, the thickness of the layer of non-magnetic material is greater than the skin thickness with the frequency mentioned here above, ranging from 25 KHz to 100 KHz. The skin thicknesses are less than one millimeter.

The device of the invention is efficient as the presence of the air gap 42 has the effect of concentrating the magnetic flow within it, thus further increasing the action of the magnetic field at the molding zones and hence the inductive energy contributed to the surface of the molding zones.

One device according to the invention therefore has the advantage of locally heating the molding zone, directly at the molding zone/material interface and not in the thickness of the mold casing. This amounts to a savings of energy. A device of this kind also has the advantage of being simple and reducing manufacturing cost.

The air gap also has the effect of limiting the influence of the geometry and/or the distribution of the inductors on the resultant heating because the air gap 42 (FIGS. 3a and 3b) "smoothens" the energy provided by the inductors. Thus, inductive turns $30'_1$ to $30'_4$ (FIG. 3b) evenly distributed on the length of the mold have practically the same effect as the same number of inductor turns $30_1$ to $30_4$ (FIG. 3a) distributed on a shorter length. This arrangement makes it possible to choose the distribution of the inductive turns.

The fixing of the layer of non-magnetic material on the mold casing may be done in various ways, for example by fixing a sheet metal or by depositing material, for example by an electrolytic deposition.

The non-magnetic material used to form the shielding preferably has low resistivity so as to limit energy losses. The material, for example, may be copper or aluminum.

The magnetic material used for the mold casing is a magnetic compound which may have a Curie temperature as well as an electrical resistivity that is greater than that of copper, as is the case for example with nickel-based, chromium-based and/or titanium-based steel alloys. High electrical resistivity of the mold casing is an advantage because it enables more efficient induction heating.

However, it must be noted that the magnetic permeability of the material constituting the mold casing also influences the efficiency of the induction heating. Indeed, if we refer to the formula mentioned above, high relative magnetic permeability leads to a lower penetration depth of the magnetic field, and a same quantity of energy is therefore distributed on a more restricted zone resulting in greater heating.

When the material has a Curie point, at a temperature close to this Curie point the material of the mold casing loses its magnetic properties and the induction heating diminishes greatly. The heating temperature may then be regulated around the Curie point.

The device shown in FIGS. 1 and 2 is provided with a cooling system to enable the making or transformation of parts by heating at a high rate, the cooling being implemented between two processing operations. In each mold casing, is a network of channels 18, 28 enabling a cooling liquid to be made to flow in the vicinity of the molding surfaces 12, 22. The cooling performs well because the metal mold casing is thermally highly conductive and because the channels may be laid out closely to the molding zones 12, 22.

In the case of the molding of a composite material, after the heating and shaping cycle, the cooling is used to fix the composite material in its definitive form.

Unlike conventional systems, the device of the invention concentrates the action of the magnetic field and the thermal effects in the vicinity of the molding zones.

As a consequence, since the heating is more localized, and there is less thermal energy to be dissipated during the cooling which is therefore faster. Thus, the cycle time of the device is reduced and the productivity is therefore increased.

FIG. 1 identifies the boundary f between each mold casing 10, 20 and the layer of non-magnetic material that lines it. The position of this boundary f relative to the molding zone 12, 22 which has an influence on the quality of the heating and hence on the molding. With the device of the invention, it is easy, by adding or removing material, to modify the position of the boundary f, thus providing flexibility in the designing of the tooling. It is possible to adjust the position of the boundary after the processing tests, especially molding, in real conditions.

Since the inductors are made up of two separable parts 32, 34 fixedly joined to the mold, the separation of the two mold casings is easy. This enables fast extraction of the part 40 after molding and therefore contributes to manufacturing at a high rate. During the transformation of a material, the electrical continuity between the two parts 32, 34 of the network of inductors is ensured by electrical contactors 36. This contactor permits a relative shift of the two parts 32, 34 of the network of inductors because the transformation of the materials is generally done at constant pressure but leads to a reduction of thickness of the material and therefore a reduction of the distance between the two mold casings 10, 20.

The transformation of the electrically conductive composite materials may benefit from another embodiment of the device. Indeed, with conductive materials (e.g. carbon-fiber-based materials), short circuits may occur and generate electrical arcs that may affect the surface of the material to be transformed and/or the surface of the molding zones. To improve the electrical insulation and thus reduce the risk of shorting, an electrical insulating layer is deposited on at least one of the two molding zones 12, 22. Such a layer comprises for example Teflon®, amorphous carbon, glass fiber or again ceramic-based materials. This layer has temperature worthiness and adapted mechanical resistance with a thickness of about one micrometer.

Conventionally, mechanical means (not shown) for ejecting the manufactured part are contemplated.

The manufacturing method thus implemented therefore comprises four phases:
    positioning of the material or materials of the part to be processed on the lower mold casing of a device,
    heating of the two molding zones, and pressurizing of the material between the two molding zones for a given period of time,
    implementing the cooling of the mold casing in order to cool the parts;
    raising the upper mold casing and ejecting/removing the part.

The method thus implemented benefits from the advantages provided by the device according to the invention. For example localized heating related to the molding zone minimizes the cycle times.

The easy adjustment of the heated zone by the addition or removal of portions of the shielding layer provides flexibility (i.e. it is easy to modify the tooling as a function of the results obtained during the first tests).

Also, the tooling is economical to produce because shielding layer 14, 24 does not necessitate complex or costly manufacture.

Figure 4:
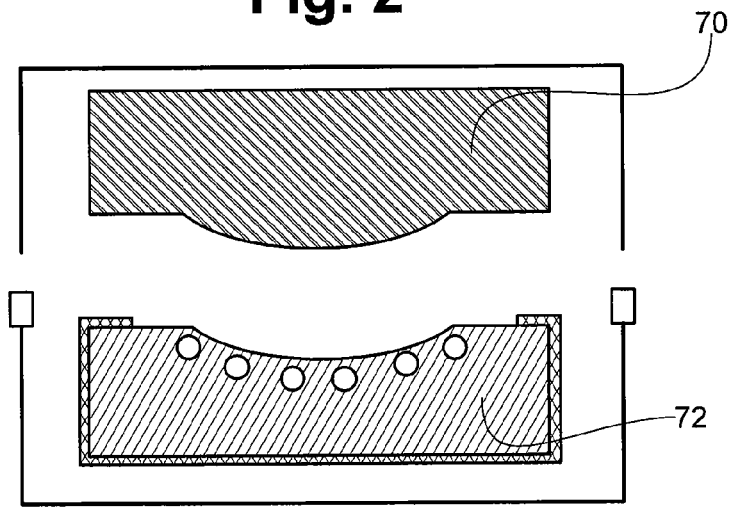
FIG. 4 shows a variant of the mold device.

One variant shown in FIG. 4 of the device according to the invention makes it possible to obtain a simpler tooling, especially in the context of the transformation of fine parts, especially parts with a thickness of less than a millimeter. Such thicknesses are used to limit the heating to only one face of the part. The invention uses a device in which one of the two mold casings is not lined with a shielding layer, this mold casing 70 comprises a non-magnetic material. Thus, this mold casing 70, which is not transparent to the magnetic field, makes available an air gap wherein the magnetic field created by the induction network 74 flows. The induction heating is therefore done primarily at the molding zone of the mold casing 72 which is coated with a shielding layer. Such a device is less costly to make because one 70 of the mold casings does not include any shielding layer. In the example of FIG. 4, the mold casing without shielding 70 may not include a cooling circuit.

Another variant (FIG. 5) provides for only one mold casing 50 around which inductive turns 52 are arranged. In this configuration, the shielding layer that surrounds the mold casing localizes the heating on the molding zone 60 without a presence of an air gap. The absence of this air gap makes such a device more sensitive to the geometry of the network of inductors, but the heating is primarily localized on the surface of the molding zone through the shielding layer.

FIGS. 6A and 6B show the molding face of the casing 10 including the shielding layer 14. In this example the die surface 23 extends in depth from the molding face. Therefore the electric currents going from one side 10a of the casing 10 to the other side 10b cross the shielding layer 14 having low electrical resistivity. The casing 10 made of a magnetic material having a higher electrical resistivity and the shielding layer again on the other side 10b of the casing. The electrical resistance seen over a flow line 610, 620 of current from one side of the casing to the other, is influenced by the travel length over the molding zone, at the surface of the casing material. Due to the three dimensional shape of the die 23, the travel length, and hence the electrical resistance, seen by a current flow line 620 following the die, is higher than the electrical resistance corresponding to a flow line 610 travelling outside of the die. Since the electrical resistance is lower on line 610, electrical current tends to concentrates at the outside of the die, giving rise to a higher heating rate at the outside of the die. In order to compensate for such an effect, the outline 'f' of the limit of the extension of the shielding layer 14 over the molding face, is chosen as so as to reduce the travel length 620 in the casing material in the die 23 area, by bringing this limit closer to the die outline, and to increase the travel length 610 in the casing material outside of the die in order to balance the electrical resistance over the whole molding face. As an example, when the shape of the die is rectangular (FIG. 6A) the outline of the shielding layer extension over the molding face is roughly trapezoid. FIG. 6B (when the die is spherical), the outline of the limit of the shielding layer over the molding face is roughly elliptic, in order to get a constant electrical resistance over the die surface and get a uniform heating over the surface of this die.

The invention claimed is:

1. A device for the transformation, by heating through conduction of thermoplastic matrix composite materials or thermosetting materials, said device comprising:
   a. two mold casings that are mobile relative to each other, made out of an electrically conductive material having first electrical resistivity, each casing comprising external surfaces and a molding face comprising dies complementary in shape and designed to be in contact with the material to be transformed in order to heat the material by conduction, and
   b. induction means enveloping the casing of the mold for generating an oscillating magnetic field with a frequency F ranging from 25 KHz to 100 KHz,
   c. one or more external surfaces of at least one of the two mold casings situated to face the induction means, being coated with a shielding layer made of a non-magnetic material having a second electrical resistivity which is lower than the first electrical resistivity to permit currents induced from the magnetic field to flow around the external surfaces of each mold casing while preventing the magnetic field from penetrating into the external surfaces of the mold casings facing the induction means, said shielding layer extending over a part of the molding face outside of the die surface and being electrically connected to the die surface of the molding face to form an electrical pathway between the shielding layer and the die surface of the molding face, said shielding layer having a thickness greater than a penetration depth of the magnetic field and at least equal to $50*(p/F)^{1/2}$ with p being the resistivity of the non-magnetic material and the thickness being less than one millimeter, so that the magnetic field is prevented from reaching the mold casing and heating it other than the die surface, and
   d. the mold casings being electrically insulated from each other during the molding phase so that the molding faces of the two mold casings are separated by an air gap, wherein the magnetic field induces the currents that flow continuously through the electrical pathway from the shielding layer to the die surface of each mold casing to concentrate the heat generated through a Joule effect to the die surface of each molding casing.

2. The device according to claim 1, wherein a shape of the extension of the shielding layer over the molding face is chosen to control a travel length of currents from one side to the other of the shielding layer following the surface of the die in the material of the casing having first electrical resistivity.

3. The device according to claim 1, wherein the two mold casings are coated with the shielding layer.

4. The device according to claim 1, wherein the mold casings are made of a magnetic steel material having high relative magnetic permeability and resistivity.

5. The device according to claim 1, wherein one mold casing is coated with the shielding layer, the other mold casing is made of a non-magnetic metallic material with low electrical resistivity that is not coated with a shielding layer.

6. The device according to claim 1, wherein the shielding layer is made of a metal sheet wrapped round the magnetic mold casing and fixed to said mold casing.

7. The device according to claim 1, wherein the shielding layer is made of an electrolytic deposit of metal over the surface of the mold casing.

8. The device according to claim 1 wherein the shielding layer is made of copper.

9. The device according to claim 1 wherein the shielding layer is made of aluminum.

10. The device according to claim 1, wherein an electrically insulating layer is applied to at least a portion of the molding surface of at least one mold casing to provide electrical insulation between the mold casings.

11. The device according to claim 1, wherein the inductive means comprise two parts, each one fixedly joined to one of the mold casings, and being capable of being shifted with the respective mold casing.

12. The device according to claim 11, wherein the two parts of the inductive means are electrically connected by means of at least one electrical contactor enabling contact to be maintained during the relative shift of one mold casing relative to the other one during the transformation phase.

* * * * *